Feb. 16, 1937.  F. R. CANNEY  2,070,782
AIRPLANE ENGINE MOUNT
Filed Jan. 9, 1935
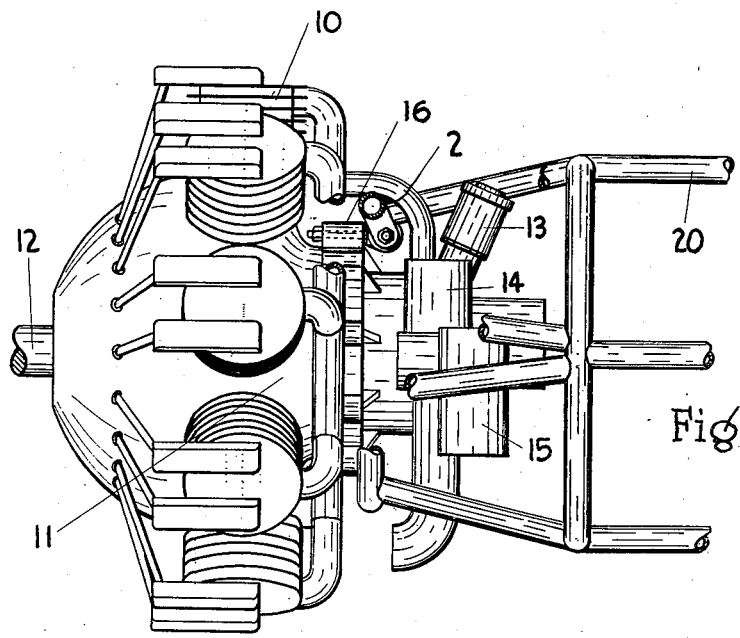
Fig. 1
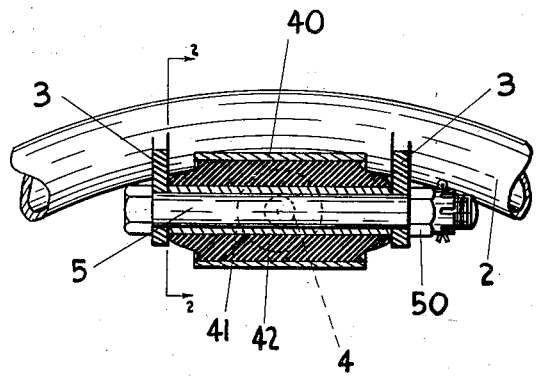
Fig. 3
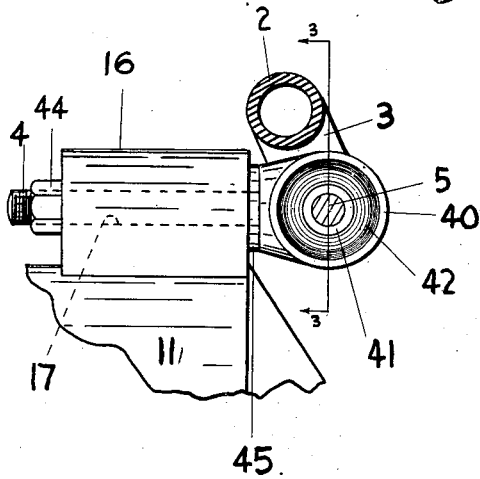
Inventor
Frank R. Canney
By Charles L. Reynolds
Attorney Patented Feb. 16, 1937

2,070,782

UNITED STATES PATENT OFFICE 2,070,782

AIRPLANE ENGINE MOUNT

Frank R. Canney, Seattle, Wash., assignor to Boeing Aircraft Company, Seattle, Wash., a corporation of Washington Application January 9, 1935, Serial No. 973

2 Claims. (Cl. 248—5)

My invention relates to the means by which engines may be mounted upon their vehicles, and more particularly to a mount intended for radial airplane engines.

A powerful radial engine, mounted upon a relatively light aircraft structure, subjects the latter to vibrational movements transversely, axially, and rotationally. The latter is particularly strong, because of the radial character of the engine, and under certain conditions or engine speeds, and when the engine is mounted on the end of a nacelle, spaced from the main spars or other main structure of the airplane, as is frequently the case, this rotational movement becomes particularly noticeable and objectionable. Practically speaking, it is not possible to prevent some of these vibrations from being carried into the airplane structure, but if the engine is so mounted that it is free to vibrate rotationally through a damping medium between the engine and the structure supporting it, most of the rotational vibration is absorbed in the damping medium, and very little of it is transmitted to the aircraft structure.

It is a further object of my invention to provide an improved type of mounting and an improved mounting device having the advantages indicated above.

My invention comprises the novel mounting means, and the novel combination of engine, mounting ring, and mounting means, as shown in the accompanying drawing, described in this specification, and as will be more particularly defined by the claims which terminate the same.

In the accompanying drawing I have shown a typical form of engine and aircraft structure with my improved mounting means joining the two together.

Figure 1 is a side elevation of such an engine and engine mount, parts being broken away and shown in section.

Figure 2 is in general a section on the line 2—2 of Figure 3, and Figure 3 is a section on the line 3—3 of Figure 2, illustrating the mounting means.

I lay no claim to the particular form of radial engine, and that illustrated is merely a typical form, embodying cylinders 10, a crank case 11, the shaft 12, and various accessories 13, 14 and 15, projecting from the rear end of the crank case. The crank case carries radially projecting lugs 16, apertured at 17 in an axial direction for the reception of mounting bolts, which usually pass through a mounting ring 2 disposed at the forward end of the aircraft structure 20, and usually provided with holes which may be brought into alignment with the holes of the lugs 16.

In the present form, however, the mounting ring 2 is made larger in circumference than the circle defined by the apertures 17 of the ears 16, and in positions to register with each of the ears 16 is provided with a pair of spaced ears 3 which project inwardly or toward the center of the mounting ring and which as shown are inclined somewhat rearwardly. Preferably each ear extends in a substantially radial plane. These ears 3 are suitably secured to the mounting ring, as for example by welding. They may be suitably braced or strengthened circumferentially of the mounting ring, if desired or found necessary.

The mounting means proper consists of a bolt 4 of a size to be received in the aperture 17, having formed upon one end a head in the form of a sleeve 40 which, as is indicated in the drawing, is of metal, extending transversely to the bolt and generally equally spaced at each side of the axis of the bolt. The length of this sleeve, however, is less than the spacing between the two ears 3 of a pair. Within this sleeve may be mounted a second sleeve 41, which is also shown in the drawing to be made of metal, projecting at each end beyond the ends of the sleeve 40, and between these two sleeves is bonded a resilient member such as the rubber sleeve 42. A bolt 5 is passed through apertures provided in the ears 3 and through the internal sleeve 41, being secured by suitable means such as the nut 50. Thus the bolt 5 and the three sleeves extend generally circumferentially of the mounting ring 2, and the bolt 4 extends generally parallel to the axis of this mounting ring, and radially of the sleeve 40. The bolt 4 is held in its engine lug by a nut 44, a washer 45 being interposed between its head and the lug.

With the engine thus held in a plurality of these mounting devices, spaced circumferentially around the crank case, the engine may vibrate somewhat axially and somewhat transversely, but the rubber sleeve will allow movement of the bolt 5 only to a limited extent in these directions, since they produce stresses transversely of the axis of the sleeves, but the sleeves will permit more extended movement in the direction of their length, and as each of these sleeves extends circumferentially, being spaced angularly from each other about the mounting ring, the combined effect of this mounting is to permit a considerable amount of movement of the engine circumferentially of its axis, and to permit only limited movement in any other direction.

The rubber sleeve should be bonded or cemented to each of the metal sleeves 40 and 41, so that, as the engine moves rotationally, the rubber is in shear, and thus most effectively cushions the engine's movement.

What I claim as my invention is:

1. A device for resiliently mounting a radial airplane engine upon a mounting ring, comprising a pair of circumferentially spaced ears on the ring, a sleeve of a length less than the spacing of said ears and received therebetween, and having a bolt integral therewith and projecting radially outward therefrom for engagement with the engine, a second sleeve received concentrically within said first sleeve, and of a length to fit snugly between said ears, a bolt extending through said second sleeve and said ears, and a rubber sleeve interposed between said first two sleeves and positively bonded to both thereof.

2. A device for resiliently mounting a radial airplane engine upon a mounting ring, comprising two concentric metal sleeves disposed circumferentially of the mounting ring, a rubber sleeve interposed between said metal sleeves and positively bonded to both thereof, a member projecting radially of the outer one of said metal sleeves and integral therewith, for securement to the engine, means extending radially of the mounting ring, and engaging opposite ends of said second sleeve, and means connecting said first means with said second sleeve.

FRANK R. CANNEY.